Patented July 28, 1953

2,647,127

UNITED STATES PATENT OFFICE 2,647,127

PROCESS FOR PREPARING METAL PHTHALOCYANINES

Robert E. Brouillard, Westfield, N. J., assignor to General Aniline & Film Corporation, New York, N. Y., a corporation of Delaware No Drawing. Application November 16, 1950, Serial No. 196,085

12 Claims. (Cl. 260—314.5)

This invention relates to an improvement in the manufacture of metal phthalocyanines.

Metal phthalocyanines have been prepared heretofore by reaction of polyvalent metals or metal-yielding compounds with aromatic o-dinitriles or corresponding o-cyanocarboxyamides yielding the corresponding dinitriles under the conditions of the reaction. Another method of preparing phthalocyanines involves reaction of said metals or metal compounds with aromatic o-dicarboxylic acids, their esters, anhydrides, mono- or diamides, imides, iminimidines, ammonium salts or aryl o-cyanocarboxy acids or ammonium salts or esters thereof, with urea, or related compounds such as guanidine, biuret, dicyandiamide, guanidylurea and cyanuric acid. The latter process is herein termed "the urea process."

These processes can be carried out in the presence or absence of inert organic liquids as solvents or diluents. Inclusion of organic solvents in such reaction mixtures in many cases results in an improvement by moderating the reaction and yielding a purer product. However, the attendant dilution, in many cases, tends to lower the yield of phthalocyanine produced.

A substantial improvement in yield in the urea process results from inclusion in the reaction mixture of catalysts, especially molybdates, in small amounts. While this is effective in many cases, the yields obtained are often unsatisfactory, especially when organic solvents are employed as diluents.

According to U. S. application Serial No. 403,866, published by the Alien Property Custodian, an improvement is effected in the preparation of metal phthalocyanines by the urea process from phthalocyanine-forming intermediates containing nuclear sulfo or carboxyl groups which do not take part in the formation of the phthalocyanine nucleus, by inclusion in the reaction mixture of aromatic carboxylic or sulfonic acids or their amides. These added materials are said to prevent foaming of the melt, which otherwise interferes with maintenance of uniform reaction temperatures. The added materials are said, however, to be effective for this purpose only in the production of phthalocyanines containing nuclear sulfo or carboxy groups.

In many cases, the preparation of metal phthalocyanines according to the processes of the prior art fails to yield a product of satisfactory purity and/or fails to provide satisfactory yields. The production of poor yields is encountered most frequently in carrying out the urea process in the presence of an organic solvent. For example, reaction of aluminum chloride with urea and phthalic anhydride in the presence of a high boiling organic solvent and a catalyst such as ammonium molybdate, forms aluminum phthalocyanine in amounts corresponding to a yield of the order of 10 to 15% of theory, based on the amount of phthalic anhydride employed. Magnesium phthalocyanine, when prepared by a similar process (employing a magnesium compound instead of aluminum chloride), is likewise produced in poor yields; and also in the production of nickel phthalocyanine, a similar procedure is relatively unsatisfactory. High yields of copper phthalocyanine can be obtained by a similar procedure, using cuprous chloride as the metal-yielding compound, but when it is attempted to prepare hexadecachloro-copper phthalocyanine from tetrachlorophthalic anhydride and cuprous chloride in an analogous procedure, the process fails to provide a satisfactory yield or a sufficiently pure product. It has been necessary, therefore, in commercial practice to prepare hexadecachloro-copper phthalocyanine by chlorination of preformed copper phthalocyanine in a suitable medium, e. g. a fused mixture of aluminum chloride and sodium chloride.

It is an object of my invention to improve the yield and quality of metal phthalocyanines, particularly in procedures heretofore used in which the yield and/or quality of the product have been unsatisfactory, and especially in the urea process employing an organic solvent as a diluent. Among the specific objects of my invention is the provision of a process for the manufacture of magnesium phthalocyanine, of aluminum phthalocyanine, of nickel phthalocyanine and of copper hexadecachloro-phthalocyanine by the urea process, employing an organic solvent wherein high yields are obtained of a product characterized by excellent quality.

The foregoing objects are achieved in accordance with my invention by inclusion, in a reaction mixture containing a phthalocyanine-forming metal-yielding reagent (a "metal donor") and an aromatic phthalocyanine-intermediate having ortho-substituents yielding a tetrazaporphine ring upon heating said reaction mixture, of a monobasic aliphatic sulfonic acid of 1 to 5 carbon atoms, or the corresponding amide, acid halide (acid chloride or bromide), ester (especially with a lower alcohol such as methanol or ethanol), or a salt of said acid with an alkali metal, ammonium, alkaline earth metal or a phthalocyanine-forming metal (especially a metal of the phthalocyanine to be formed, or of a phthalocyanine-forming metal which is displaceable by the metal of the phthalocyanine to be formed), said sulfonic acid compound being non-reactive toward the phthalocyanine resulting in the reaction (except for yielding a salt-forming metal thereto) and non-reactive toward the ortho-substituted aromatic intermediate therefor in such manner as to combine therewith or to modify the organic structure of the resulting phthalocyanine compound; and heating said mixture to form the metal phthalocyanine. The aforesaid monobasic acids, salts, acid halides, amides, and esters are especially effective for the purposes of this invention, and are preferably employed in the urea process, particularly when carried out in the presence of an inert organic solvent, and preferably, also, of a catalyst such as a molybdate.

For example, I have found that inclusion of ethane sulfonic acid or an alkali metal or alkaline earth metal salt thereof in a reaction mixture for preparation of chloroaluminum phthalocyanine, containing urea, phthalic anhydride, a molybdate catalyst, and an organic solvent, increases the yield from about 12% to about 85% of theory. Similarly, improved yields are obtained in the same manner in the preparation of magnesium phthalocyanine and nickel phthalocyanine, as well as in the preparation of copper hexadecachlorophthalocyanine from tetrachlorophthalic anhydride.

The promoting agents employed in accordance with my invention include the alkali metal (Na, K), ammonium (NH4), alkaline earth metal (Ca, Sr, Ba, Mg), and phthalocyanine-forming metal (Cu, Ni, Fe, Co, Sn, Al, Zn, etc.) salts of methane sulfonic acid, ethane sulfonic acid, propane-α-and -β-sulfonic acids, n-butane sulfonic acid, isobutane sulfonic acid, isopentane sulfonic acid, allyl sulfonic acid, taurine, isethionic acid, β-choloroethane sulfonic acid, β-nitroethane sulfonic acid, mixed saturated aliphatic hydrocarbon sulfonic acids (e. g. of methane, ethane and propane), the corresponding free acids, acid chlorides and bromides, amides, and lower alcohol esters (e. g. the methyl or ethyl esters) of the aforesaid acids. On the other hand, it has been found that diisobutyl sodium sulfosuccinate (an ester salt of a polybasic aliphatic sulfonic acid) produces no similar increase in yield or quality of a phthalocyanine.

The aforesaid aliphatic monobasic sulfonic acid compounds are preferably employed in amounts corresponding to about one-half to two-thirds of the weight of the aromatic phthalocyanine intermediate. In general, the amount of monobasic sulfonic acid compound can be varied from about 25 to about 100% by weight of said intermediate. Higher amounts have no substantial effect and when substantially smaller amounts are used, the effect is materially decreased.

The preferred organic phthalocyanine-forming intermediates for the process of my invention are phthalic anhydride and its nuclear substitution products, including, for example, those containing halo, nitro, alkyl, aryl, condensed nuclear aryl, aryloxy, alkoxy, arylthio, alkylthio and aryl keto or alkyl keto groups (i. e., acyl groups). Instead of phthalic anhydride, the corresponding free acid may be used or its esters, salts (especially the ammonium salt), mono- and diamides, the corresponding imide, as well as the corresponding o-cyanocarboxylic acid and its esters, ammonium salt or amide. With these intermediates a nitrogen donor is employed, which in the present process is preferably urea. However, instead of urea there can be used related compounds such as guanidine, biuret, dicyandiamide, guanidylurea and cyanuric acid.

Solvents suitable for the reaction are inert organic liquids having a sufficiently high boiling point to remain liquid under the conditions of the reaction. They include, for example, trichlorobenzene, dichlorobenzene, naphthalene and its chlorinated derivatives, quinoline, benzophenone, etc.

In general, it is customary and advantageous to include a catalyst or auxiliary agent of the type disclosed in USP 2,214,477, such compounds generally containing an element of group V or VI of the periodic system having an atomic number from 15 to 92, inclusive, and especially molybdates such as the alkali metal or ammonium molybdates, phosphomolybdates or tungstomolybdates. Suitable amounts of such catalysts range from 0.1 to 2% of the weight of the total reaction mixture.

Metal-yielding components suitable for inclusion in the reaction mixtures of this invention are those heretofore employed in the manufacture of metal phthalocyanines—namely, polyvalent metals and their salts such as those of copper, aluminum, magnesium, nickel, iron, cobalt, zinc, vanadium and the like. Suitable salts of these metals, in addition to salts of the aliphatic monobasic sulfonic acids discussed above, are generally the halides (i. e., chlorides or bromides), sulfates, nitrates and oxides of these metals.

My invention is illustrated by the following examples, wherein parts are by weight.

*Example 1*

10.5 parts of phthalic anhydride, 12.5 parts of urea, 0.25 part of ammonium molybdate and 5.4 parts of ethane sulfonic acid are slurried in 35 parts of trichlorobenzene. A slurry of 3 parts of anhydrous aluminum chloride in 5 parts of trichlorobenzene are added, and the mixture is agitated and heated gradually under reflux to 200 to 205° C. over a period of 6 hours. A slurry of 5.4 parts of urea in 10 parts of trichlorobenzene are then added, and the temperature maintained at 200 to 205° C. for 5 hours. Chloroaluminum phthalocyanine produced in the resulting reaction is recovered by filtration of the reaction mixture after cooling, the filter cake being washed with trichlorobenzene and dried. A yield of 85% of theory of chloroaluminum phthalocyanine is obtained in substantially pure form.

Similar results are obtained by substituting an equal amount of sodium, ammonium calcium or magnesium ethane sulfonate for the ethane sulfonic acid of this example. When magnesium ethane sulfonate is used, chlorcaluminum phthalocyanine is formed despite the fact that magnesium is also a phthalocyanine-forming metal, magnesium being replaceable by hydrogen and by acid-stable phthalocyanine-forming metals, while aluminum forms an acid-stable phthalocyanine and is not replaceable by hydrogen or other metals in the pigment. Moreover, an equal amount of aluminum ethane sulfonate can be substituted for the ethane sulfonic acid of the example.

Example 2

101.5 parts of tetrachlorophthalic anhydride, 63 parts of ethane sulfonic acid, 11 parts of cuprous chloride, 75 parts of urea and 1.25 parts of ammonium molybdate are slurried in 400 parts of trichlorobenzene, and the mixture heated with agitation at 200 to 205° C. for 5 hours. On filtering the mixture, washing the filter cake with trichlorobenzene, and drying, a good yield of brilliant green hexadecachloro-copper phthalocyanine is obtained.

Example 3

116.2 parts of phthalamide, 126 parts of urea, 30 parts of aluminum trichloride, 2.5 parts of ammonium molybdate and 54 parts of a mixture of methane-, ethane- and propane sulfonic acids are slurried in 400 parts of trichlorobenzene, and the mixture heated at 200 to 205° C. for one hour. A slurry of 54 parts of urea in 100 parts of trichlorobenzene is added to the mixture and the latter agitated at 200 to 205° C. for 5 additional hours. The mixture is filtered, the filter cake washed with trichlorobenzene, and dried. Chloroaluminum phthalocyanine is formed in a yield of the same order as in the first example, and can be purified by extraction with aqueous caustic soda.

Instead of phthalamide, 104.2 parts of phthalimide or 103.7 parts of o-cyanobenzamide can be used to obtain similar results.

Example 4

10.5 parts of phthalic anhydride, 12.6 parts of urea, 2.96 parts of anhydrous nickel chloride, 0.25 part of ammonium molybdate and 5.4 parts of sodium ethane sulfonate are slurried with 40 parts of trichlorobenzene and the mixture heated at 200° C. for one hour. 5.4 parts of urea in the form of a slurry in 10 parts of trichlorobenzene are then added to the mixture, and the latter heated at 200° C. for 4 hours. The mixture is then filtered and dried, slurried with hot aqueous alkali, filtered and washed with water, whereby nickel phthalocyanine is obtained in good yield.

Example 5

10.5 parts of phthalic anhydride, 12.6 parts of urea, 0.91 part of magnesium oxide, 0.25 part of ammonium molybdate and 5.4 parts of ethane sulfonic acid are slurried with 40 parts of trichlorobenzene and the mixture heated with agitation at 200° C. for 4 hours. The reaction mixture is then filtered, the trichlorobenzene removed from the filter cake, and the latter slurried with hot aqueous alkali. The slurry is filtered hot, and the filter cake washed with water until neutral, whereby a high yield of bright blue magnesium phthalocyanine is obtained.

The same product is obtained in this example by substituting, for the ethane sulfonic acid, a similar amount of magnesium ethane sulfonate. The additional magnesium present in the latter compound permits a corresponding decrease in the amount of magnesium oxide, e. g. to 0.38 part instead of 0.91 part.

Similar results are achieved by the procedures of the foregoing examples upon substituting for the alkane sulfonic acids or their salts specified above, a similar amount of other alkane sulfonic acids e. g. methane-, ethane-, propane-, isopropane-, butane-, isobutane-, or isopentane sulfonic acids; mixtures thereof, their sodium, potassium, ammonium, calcium or magnesium salts, or salts thereof with appropriate phthalocyanine-forming metals (such as Cu, Ni, Al, Mg, Zn, Co, Fe, or Sn salts), the corresponding acid chlorides or bromides of the aforesaid acids, and amides, or esters thereof such as the methyl or ethyl esters. Similarly, sulfonic acids containing chain substituents such as Cl, OH, NH$_2$, or NO$_2$ can be used (e. g. taurine, isethionic acid, β-chloroethane sulfonic acid, or β-nitroethane sulfonic acid) as well as salts thereof of the aforesaid metals or the ammonium radical, their esters, amides or acid halides. Preferably, the free sulfonic acids or their alkali metal or ammonium salts are employed.

Instead of urea, there can be used biuret, guanidylurea, dicyandiamide or cyanuric acid. Ammonium molybdate can be replaced by alkali metal molybdates, phosphomolybdate or tungstomolybdates. Other compounds having similar catalytic action can be similarly used.

Convenient metal donors are those disclosed in the examples. Metallic copper or other cuprous salts can be used instead of cuprous chloride; aluminum sulfate or acetate can replace aluminum chloride; magnesium nitrate or chloride can replace magnesium oxide, and nickel nitrate can replace nickel chloride. Salts of cobalt, metallic zinc or its salts, iron or iron salts can be substituted for the metal compounds of the examples to prepare the corresponding metal phthalocyanines.

Instead of the o-dicarboxy anhydrides or amide of the examples, there can be employed as aromatic o-substituted phthalocyanine-forming intermediates, the corresponding free acids, their ammonium salts and esters, mono- or diamide or imide, esters or ammonium salt of the corresponding monoamide, as well as the corresponding o-cyanobenzoic acid, its ammonium salt, ester or amide. Other suitable intermediates are the corresponding o-dicarboxylic acid chlorides, e. g. phthalyl chloride, and compounds which react in similar manner under the reaction conditions, for example, ω,ω'-polychloro- or -polybromo-o-dimethyl aromatic compounds (e. g. ω,ω'-tetra-, -penta-, or -hexachloro-o-xylene); or ω-chloro- or -bromo-o-methyl aromatic nitriles (e. g. ω-mono-, -di- or -tri-o-tolunitrile).

The aforesaid aromatic intermediates are preferably of the benzene series and can contain additional nuclear substituents which are non-reactive under the reaction conditions, e. g. chlorine, bromine, nitro, alkoxy, aryloxy, alkylthio or arylthio radicals, alkyl or aryl keto radicals, and alkyl or aryl hydrocarbon radicals.

Trichlorobenzene, employed as a diluent in the examples can be replaced by other inert organic solvents such as nitrobenzene, dichlorobenzene, benzophenone, naphthalene, chlorinated naphthalenes, quinoline and the like, which have a sufficiently high boiling point to permit operation in the liquid phase at reaction temperature. If desired, superatmospheric pressure can be used to maintain the solvent in liquid form during the reaction.

Suitable amounts of the aliphatic monobasic sulfonic acid compounds employed in accordance with this invention are at least 25% of the weight of the aromatic phthalocyanine-forming intermediate (e. g. of the amount of phthalic anhydride). Amounts substantially exceeding the weight of the phthalocyanine-forming intermediate produce no substantial improvement in yield or quality and are preferably not employed. The proportions in the examples wherein the amount is approximately one-half to two-thirds the amount of the organic intermediate are generally preferred.

Suitable proportions for the remaining ingredients of the reaction mixture are illustrated in the examples. Thus, the amount of trichlorobenzene may be about 4 to 5 times the amount of aromatic phthalocyanine-forming intermediate. An equivalent amount of other inert solvents can be used instead. The amount of urea is preferably 2½ to 5 mols per mol of the aromatic phthalocyanine-forming intermediate. The proportion of metal-yielding compound is somewhat in excess (e. g. an excess of 10 to 30%) of the amount theoretically required to form a metal phthalocyanine with the intermediate employed. Thus, in the examples, at least 0.28 to 0.32 mol of metal compound (containing one atom of metal) is employed per molecule of phthalic anhydride or derivative thereof, the amount of metal compound theoretically required being 0.25 mol per mol of the phthalic anhydride. When the aliphatic monobasic sulfonic acid compound employed is a salt of the acid with the metal which forms the phthalocyanine to be prepared, the quantity of other metal donor reagents can be correspondingly decreased to maintain the quantity of available metal within the foregoing limits. Ammonium molybdate, or similar catalylsts, are advantageously employed in an amount corresponding to 0.1 to 0.5% of the weight of the total reaction mixture. Amounts up to 2% can be used but are, in general, not required.

The reaction temperature can be varied over a considerable range, depending upon the specific reagents employed. Suitable temperatures generally lie within the range of 150 to 210° C. Satisfactory results can be obtained in most cases by maintaining a temperature of about 200° C. for 4 to 5 hours.

The pigments produced can be readily isolated from the reaction mixture by filtration, removal of the organic solvent and extraction with water or an aqueous alkali.

An improvement can also be effected in many cases by similar inclusion of the aforesaid aliphatic monobasic sulfonic acid compounds in a reaction mixture yielding a phthalocyanine pigment by the urea process, also when the reaction is carried out in the absence of a solvent and/or in the absence of a molybdate or similar catalyst. In like manner, an improvement is often effected by the inclusion of the aforesaid aliphatic monobasic sulfonic acid compounds in phthalocyanine-yielding reaction mixtures employing the corresponding aromatic o-dinitriles in which urea is not required, a solvent being employed or omitted.

Thus, in general, the improvement of my invention involves inclusion of an aliphatic monobasic sulfonic acid, a salt thereof (as hereinbefore defined), a corresponding acid halide, amide, or an ester thereof such as a lower alkyl ester in reaction mixtures containing a phthalocyanine-yielding metal reagent and an aromatic phthalocyanine intermediate having orthto-substituents which form a tetrazaporphine ring upon heating in said reaction mixture, the amount of said aliphatic monobasic sulfonic acid compounds being at least 25% of the weight of said phthalocyanine intermediate.

Variations and modifications which will be obvious to those skilled in the art can be made in the procedures hereinbefore described, without departing from the scope or spirit of this invention.

I claim:

1. In a process for preparing a metal phthalocyanine by heating a reaction mixture containing a phthalocyanine-forming metal-yielding reagent, and an aromatic phthalocyanine intermediate having in a carbocyclic aromatic nucleus, ortho-substituents which form a tetrazaporphine ring upon heating in said reaction mixture, the improvement which comprises including in said reaction mixture a member of the group consisting of aliphatic monobasic sulfonic acids of 1 to 5 carbon atoms, salts thereof, esters thereof, and the corresponding amides and acid halides, in an amount corresponding to at least 25% of the weight of said aromatic phthalocyanine intermediate.

2. In a process for the preparation of a metal phthalocyanine, which comprises heating a reaction mixture containing an aromatic intermediate of the group consisting of arylene o-dicarboxylic acids, the corresponding anhydrides, imides, diamides, and diammonium salts, the corresponding monoamides and their ammonium salts, and the corresponding o-cyanocarboxylic acids, their amides and their ammonium salts, with a phthalocyanine-forming metal-yielding reagent, and a nitrogen donor of the group consisting of urea, biuret, guanidine, guanidyl-urea, dicyandiamide and cyanuric acid, in an inert organic liquid diluent, the improvement which comprises including in said reaction mixture a member of the group consisting of aliphatic monobasic sulfonic acids of 1 to 5 carbon atoms, salts thereof with alkali metals, ammonium, alkaline earth metals, and phthalocyanine-forming metals, esters thereof, and the corresponding amides and acid halides, in an amount corresponding to at least 25% of the weight of said aromatic phthalocyanine intermediate.

3. A process as defined in claim 2, wherein said reaction mixture further includes a molybdate catalyst.

4. A process as defined in claim 3, wherein said reaction mixture is heated at a temperature of 150 to 210° C.

5. A process as defined in claim 2, wherein said metal-yielding reagent is a magnesuim compound, and the reaction mixture contains a molybdate catalyst.

6. A process as defined in claim 2, wherein said metal-yielding reagent is an aluminum salt, and the reaction mixture contains a molybdate catalyst.

7. A process as defined in claim 2, wherein said metal-yielding reagent is a nickel compound, and the reaction mixture contains a molybdate catalyst.

8. A process as defined in claim 2, wherein said aromatic intermediate is tetrachlorophthalic anhydride, said metal-yielding reagent is a copper salt, and the reaction mixture contains a molybdate catalyst.

9. A process for preparing chloroaluminum phthalocyanine which comprises heating a reaction mixture at about 200° C., containing aluminum chloride, phthalic anhydride and urea, in an inert organic liquid diluent together with a molybdate catalyst and an aliphatic monosulfonic acid of 1 to 5 carbon atoms in an amount corresponding to 25 to 100% of the weight of phthalic anhydride.

10. A process for preparing magnesium phthalocyanine which comprises heating a reaction mixture at about 200° C., containing magnesium oxide, phthalic anhydride and urea, in an inert organic liquid diluent together with a molybdate catalyst and an aliphatic monosulfonic acid of 1 to 5 carbon atoms in an amount corresponding to 25 to 100% of the weight of phthalic anhydride.

11. A process for preparing nickel phthalocyanine which comprises heating a reaction mixture at about 200° C., containing nickel chloride, phthalic anhydride and urea, in an inert organic liquid diluent together with a molybdate catalyst and an aliphatic monosulfonic acid of 1 to 5 carbon atoms in an amount corresponding to 25 to 100% of the weight of phthalic anhydride.

12. A process for preparing copper hexadecachlorophthalocyanine which comprises heating a reaction mixture at about 200° C., containing cuprous chloride, tetrachlorophthalic anhydride and urea, in an inert organic liquid diluent together with a molybdate catalyst and an aliphatic monosulfonic acid of 1 to 5 carbon atoms in an amount corresponding to 25 to 100% of the weight of tetrachlorophthalic anhydride.

ROBERT E. BROUILLARD.

References Cited in the file of this patent
UNITED STATES PATENTS

| Number | Name | Date |
|---|---|---|
| 2,197,458 | Wyler | Apr. 16, 1950 |